(12) United States Patent
Higashiyama (10) Patent No.: US 7,862,190 B2
(45) Date of Patent: Jan. 4, 2011

(54) SURFACE LIGHT SOURCE FOR EMITTING LIGHT FROM TWO SURFACES AND DOUBLE-SIDED DISPLAY DEVICE USING THE SAME

(75) Inventor: Hiroshi Higashiyama, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 682 days.

(21) Appl. No.: 11/923,450

(22) Filed: Oct. 24, 2007

(65) Prior Publication Data

US 2008/0070638 A1    Mar. 20, 2008

Related U.S. Application Data

(63) Continuation of application No. 11/605,569, filed on Nov. 29, 2006, now Pat. No. 7,347,605, which is a continuation of application No. 11/282,521, filed on Nov. 18, 2005, now Pat. No. 7,156,546, which is a continuation of application No. 10/461,768, filed on Jun. 13, 2003, now Pat. No. 6,981,791.

(30) Foreign Application Priority Data

Jun. 17, 2002    (JP) .............................. 2002-175858

(51) Int. Cl.
*H04M 1/22*    (2006.01)
(52) U.S. Cl. .............................. 362/88; 362/19; 362/24; 362/606; 455/566; 349/65
(58) Field of Classification Search ............... 362/19, 362/24, 26, 88, 561, 600, 606; 349/64, 65; 455/566
See application file for complete search history.

(56) References Cited

U.S. PATENT DOCUMENTS

| 5,625,968 | A  | 5/1997  | Ashall       |
|-----------|----|---------|--------------|
| 5,742,367 | A  | 4/1998  | Kozaki       |
| 6,494,593 | B2 | 12/2002 | An et al.    |
| 6,513,942 | B2 | 2/2003  | Ludwig et al.|
| 6,674,496 | B2 | 1/2004  | Wei          |

(Continued)

FOREIGN PATENT DOCUMENTS

JP    2000-206523 A    7/2000

(Continued)

*Primary Examiner*—Stephen F Husar
(74) *Attorney, Agent, or Firm*—Holtz, Holtz, Goodman & Chick, PC (57) ABSTRACT

A surface light source device includes a light-emitting element which generates light, and a light guide plate which causes light emitted from the light-emitting element to be incident from an end face, causes the light to be reflected between opposite plate surfaces to guide the light along the plate surfaces and make the light emerge from the plate surfaces, and transmits light incident from one plate surface toward the other plate surface. A first optical element is placed on one plate surface side of the light guide plate, transmits part of light emerging from one plate surface of the light guide plate toward a front side, and returns the remaining light to a rear side. A second optical element is placed on the other plate surface side and transmits at least part of light emerging from the other plate surface side.

21 Claims, 4 Drawing Sheets

| U.S. PATENT DOCUMENTS | | | |
|---|---|---|---|
| 6,741,301 B2 | 5/2004 | Tsuji | |
| 7,230,585 B2 * | 6/2007 | Wakefield | 345/55 |
| 2003/0063456 A1 | 4/2003 | Katahira | |
| 2004/0080924 A1 | 4/2004 | Chuang | |

| FOREIGN PATENT DOCUMENTS | | |
|---|---|---|
| KR | 2001-35369 A | 5/2001 |

* cited by examiner

SURFACE LIGHT SOURCE FOR EMITTING LIGHT FROM TWO SURFACES AND DOUBLE-SIDED DISPLAY DEVICE USING THE SAME

CROSS-REFERENCE TO RELATED APPLICATIONS

The present application is a Continuation application of U.S. application Ser. No. 11/605,569, filed Nov. 29, 2006 now U.S. Pat. No. 7,347,605, which is a Continuation of U.S. application Ser. No. 11/282,521, filed Nov. 18, 2005, now U.S. Pat. No. 7,156,546 which is a Continuation application of Ser. No. 10/461,768 filed Jun. 13, 2003, now U.S. Pat. No. 6,981,791, which is based upon and claims the benefit of priority from the prior Japanese Patent Application No. 2002-175858, filed Jun. 17, 2002, the entire contents of which are incorporated herein by reference.

BACKGROUND OF THE INVENTION

1. Field of the Invention

The present invention relates to a surface light source having flat exit surfaces on its upper and lower surfaces and a double-sided display device using the light source.

2. Description of the Related Art

As a surface light source having a flat exit surface, a light source is known, which has a light-emitting element and a light guide plate which allows light emitted from the light-emitting element to be incident from an end face, and causes the light to emerge from the front surface.

Conventionally, a surface light source of this type is comprised of a light guide plate which is formed from a transparent plate such as an acrylic resin plate and has one end face on which a light from a light source is incident, a front surface from which light transmitted through the transparent plate emerges, and a reflecting film formed on an entire rear surface facing the front surface of the transparent plate, and a light-emitting element serving as the light source formed from an LED (Light-Emitting Diode), cold cathode tube, or the like.

In this surface light source, light emitted from the light-emitting element and incident on the light guide plate from the incident end face is guided in the light guide plate while repeating internal reflection of the light by the front surface of the light guide plate and reflection of the light by the rear surface of the light guide plate, and the light finally emerges from the front surface.

The above surface light source is used as an illumination light source for a display device such as a liquid crystal display device. In a display device of this type, a display element which performs display by controlling transmission of light is placed on the front side of the surface light source such that the observation surface of display faces the opposite side to the surface light source.

Recently, as electronic equipment such as a cell phone or portable terminal device having a lid that can open and close with respect to an equipment body, an electronic equipment has appeared, which has display sections on the inner surface (the surface that faces the equipment body when the lid is closed) and the outer surface so as to be capable of displaying information while the lid is open and closed.

A conventional surface light source is designed to make light emerge to only the front side. In order to manufacture the electronic equipment having display sections on the two surfaces, therefore, surface light sources must be placed on the respective display sections.

BRIEF SUMMARY OF THE INVENTION

It is an object of the present invention to provide a surface light source which can cause light to emerge to both the front side and the rear side, and a display device which can perform display operation using both one surface and the other surface as display surfaces by using one surface light source.

In order to achieve the above object, according to the first aspect of the present invention, there is provided a surface light source device comprising a light-emitting element which generates light, a light guide plate which has a plate-like shape, causes light emitted from the light-emitting element to be incident from one end face of the plate, causes the light to be reflected between plate surfaces of the plate to guide the light to the entire plate surfaces and make the light emerge from the two plate surfaces, and transmits light incident from one plate surface toward the other plate surface, a first optical element which is placed on one plate surface side of the light guide plate, transmits part of light emerging from one plate surface of the light guide plate toward the front side, and returns the remaining light to a rear side, and a second optical element which is placed on the other plate surface side of the light guide plate and transmits at least part of light emerging from the other plate surface side of the light guide plate.

This surface light source causes most of light emitted from the light-emitting element and entering the light guide plate from its end face to emerge from the front surface of the light guide plate, and causes part of the light to be transmitted through the first optical element placed on the front side of the light guide plate and emerge to the front side. The surface light source also causes the first optical element to return the remaining light to the rear side, and causes the return light to be transmitted through the light guide plate and emerge to its rear surface. The surface light source then causes at least part of the light to be transmitted through the second optical element placed on the rear side of the light guide plate and emerge to the rear side. According to the surface light source, light can be made to emerge to both the front side and the rear side.

In the surface light source of the present invention, it is preferable that the first optical element placed on the front side of the light guide plate be formed from a diffusion layer which diffuses incident light and causes the diffused light to emerge from both one surface and the other surface, and the second optical element placed on the rear side of the light guide plate be a semitransparent reflective layer. It is also preferable that the second optical element be formed from a semitransparent reflective layer to which a white pigment is added.

The surface light source of the present invention may have an arrangement in which the first optical element placed on the front side of the light guide plate and the second optical element placed on the rear side of the light guide plate are formed into polarizing/separating layers each of which reflects one of two different polarized light components of incident light and transmits the other polarized light component, and the polarizing/separating layers are arranged such that light reflected by one polarizing/separating layer is transmitted through the other polarizing/separating layer. In this case, as the polarizing/separating layer, a reflection polarizing plate is used, which transmits one of two linearly polarized light components having orthogonal planes of polarization, and reflects the other linearly polarized light component, or comprises a circularly polarizing/separating element which separates light into a clockwise circularly polarized light component and a counterclockwise circularly polarized light component, and two λ/4 plates placed to sandwich the circularly polarizing/separating layer.

In addition, the light guide plate preferably has, on the other plate surface, a diffusion surface which diffuses internally reflected light.

In this case, a refracting layer which refracts light emerging from the light guide plate and transmitted through the first optical element in a direction substantially parallel to the normal to the front surface of the light guide plate is preferably placed outside the first optical element. More specifically, the refracting layer comprises a prism sheet on which oblong prism portions parallel to one end face of the light guide plate at which the light-emitting element is placed are densely arrayed parallel to each other.

The light guide plate may have an arrangement in which a reflecting/refracting surface refracts light, internally reflected by the plate surface, in a direction in which an angle with respect to the normal to the plate surface of the light guide plate becomes smaller than that when the light is regularly reflected by a surface parallel to the front surface is formed on the other plate surface of the light guide plate.

A display device according to the second aspect of the present invention comprises the surface light source device of the present invention described above, a first display element which is placed on one plate surface side of the surface light source device and performs display operation by controlling transmission of light, and a second display element which is placed on the other plate surface side of the surface light source device and performs display operation by controlling transmission of light.

In the display device of the present invention, the first display element is placed on one side of the surface light source device of the present invention described above such that a surface on the opposite side to the observation side of display opposes the surface light source device, and the second display element is placed on such that a surface opposite to the observation side of display opposes the surface light source device, thereby performing display operation using both one surface and the other surface as display surfaces.

In this display device, it is preferable that the first and second display elements have different display areas, and the second display element have a smaller display area than the first display element.

In the display device of the present invention, at least one of the first and second display elements is preferably a semitransparent reflective display element which can perform both transmission display realized by controlling transmission of light emerging from the surface light source device and reflection display realized by controlling transmission of external light incident from an observation side. In this case, the semitransparent reflective display element preferably includes a semitransparent reflective film formed from a porous metal film.

In this display device as well, it is preferable that the first optical element be formed from a diffusion layer which diffuses incident light and causes the diffused light to emerge from both one surface and the other surface, and the second optical element be formed from a semitransparent reflective layer. Alternatively, it is preferable that the first and second optical elements be formed from polarizing/separating layers each of which reflects one of two different polarized light components of incident light and transmits the other polarized light component, and the polarizing/separating layers be arranged such that light reflected by one polarizing/separating layer is transmitted through the other polarizing/separating layer. As this polarizing/separating layer, a reflection polarizing plate is preferably used, which transmits one of two linearly polarized light components having orthogonal planes of polarization, and reflects the other linearly polarized light component.

In addition, in this display device, a refracting layer which refracts light emerging from the light guide plate and transmitted through the first optical element in a direction substantially parallel to the normal to the front surface of the light guide plate is preferably placed outside the first optical element. The refracting layer is formed from a prism sheet on which oblong prism portions parallel to one end face of the light guide plate at which the light-emitting element is placed are densely arrayed parallel to each other, or realized by forming, on the other plate surface of the light guide plate, a reflecting/refracting surface which refracts light, internally reflected by the plate surface, in a direction in which an angle with respect to the normal to the plate surface of the light guide plate becomes smaller than that when the light is regularly reflected by a surface parallel to the front surface.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
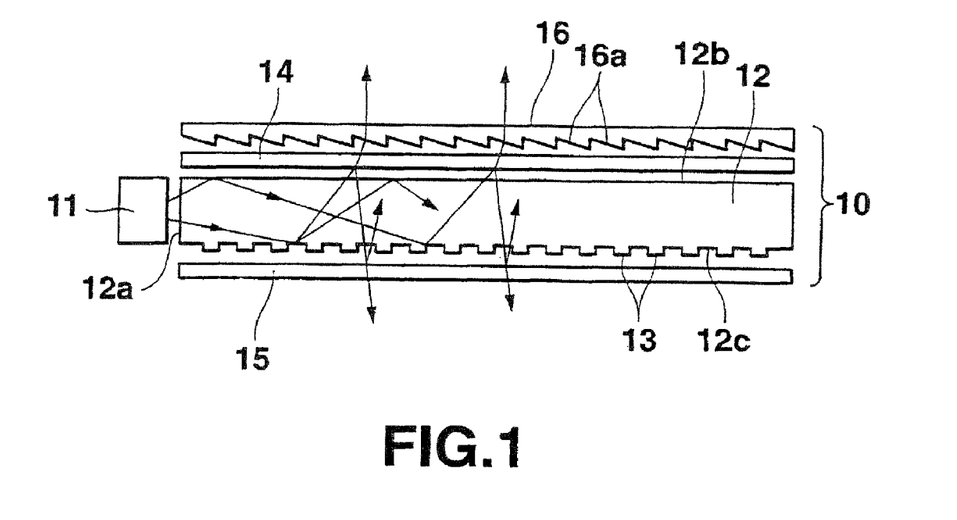
FIG. 1 is a side view of a surface light source device according to the first embodiment of the present invention.

Liquid crystal display devices will be described below as embodiments of the present invention with reference to the accompanying drawings First Embodiment FIG. 1 shows a surface light source device according to the first embodiment of the present invention. A surface light source device 10 of this embodiment includes a light-emitting element 11, light guide plate 12, and first and second optical elements 14 and 15. The light guide plate 12 is placed to have one end face facing the light-emitting element 11. The light guide plate 12 lets light emitted from the light-emitting element 11 strike the end face and guides the light, while making it be internally reflected by one plate surface and the other plate surface, so as to make the light emerge from one plate surface. The light guide plate 12 also transmits light incident from one plate surface and the other plate surface to the opposite sides. The first optical element 14 is placed one plate side of the light guide plate 12. The first optical element 14 transmits part of the light emerging from one plate surface of the light guide plate 12 and returns the remaining light to the other plate surface side. The second optical element 15 is placed on the other plate surface side of the light guide plate 12. The second optical element 15 transmits at least part of the light emerging from the other plate surface of the light guide plate 12.

The light-emitting element 11 is a solid-state light-emitting element including, for example, a red LED for emitting red light, a green LED for emitting green light, and a blue LED for emitting green light, which are molded with a light scattering resin. By simultaneously turning on the LEDs of the respective colors, white light obtained by mixing light components of the three colors, i.e., red, green, and blue, emitted from the LEDs emerges.

One or a plurality of light-emitting elements 11 formed from such solid-state light-emitting elements is or are placed to oppose one end face of the light guide plate 12.

In this embodiment, light emitted from the light-emitting element 11 is directly incident on the light guide plate 12. However, light emitted from the light-emitting element 11 may be diffused by a diffusion layer first, and then incident on the light guide plate. Alternatively, the light-emitting element 11 may be placed to emit light in a different direction, and the emitted light is guided using a light guiding means such as a mirror so as to make the light strike the light guide plate 12. The light-emitting element 11 may be a cold cathode tube or the like.

The light guide plate 12 is a transparent plate made of, for example, an acrylic resin, and has one end surface serving as an incident end face 12a on which light emitted from the light-emitting element 11 is incident. One plate surface 12b (to be referred to as a front surface 12b hereinafter) of the light guide plate 12 is formed into a flat surface. The other plate surface 12c (to be referred to as a rear surface 12c hereinafter) of the light guide plate 12 is formed into a diffusion surface for diffusing internally reflected light on the rear surface 12c. In this embodiment, the rear surface 12c of the light guide plate 12 is a diffusion surface formed from an embossed surface on which fine projections 13 are formed at a very small pitch.

The first optical element 14 placed on the front side (front surface 12b side) of the light guide plate 12 is formed from a diffusion layer, e.g., a transparent resin film in which light scattering particles are dispersed, which diffuses light incident from one surface, and makes the diffused light emerge from the two surfaces, i.e., one surface and the other surface. The first optical element 14 will be referred to as a diffusion layer hereinafter.

The second optical element 15 placed on the rear side (rear surface 12c side) of the light guide plate 12 is a white semitransparent reflective layer, e.g., a very thin, white film of a thickness of 0.05 to 0.075 mm, made of PET (polyethylene terephthalate) or the like containing white pigment. The element 15 reflects and transmits light incident from one surface at a reflectance and transmittance corresponding to the amount of white pigment added. The second optical element 15 will be referred to as a white semitransparent reflective layer hereinafter.

The diffusion layer 14 is placed on the front side of the light guide plate 12, with an air layer being interposed between the diffusion layer 14 and the front surface 12b of the light guide plate 12. The white semitransparent reflective layer 15 is placed on the rear side of the light guide plate 12, with an air layer being interposed between the white semitransparent reflective layer 15 and the rear surface 12c of the light guide plate 12.

The surface light source device 10 in this embodiment includes a refracting layer 16 which is placed on the front side (the opposite side to the light guide plate of the diffusion layer 14) placed on the front side of the light guide plate 12, and refracts light emerging to the front side of the diffusion layer 14 in a direction (to be referred to as a direction near the normal hereinafter) substantially parallel to the normal to the front surface 12b of the light guide plate 12.

The refracting layer 16 is formed from a prism sheet obtained by forming narrow, oblong prism portions 16a on one surface of a transparent resin film made of an acrylic resin such that the prism portions are densely arrayed parallel to each other on the entire region of the surface. The refracting layer 16 will be referred to as a prism sheet hereinafter.

The prism sheet 16 is placed such that its surface on which the oblong prism portions 16a are formed faces the front surface of the diffusion layer 14. The ridges of the oblong prism portions 16a are brought close to or into contact with the front surface of the diffusion layer 14.

The surface light source device 10 causes light emitted from the light-emitting element 11 and incident from the incident end face 12a of the light guide plate 12 to emerge from the front surface 12b of the light guide plate 12. The device 10 causes part of the light to be transmitted through the diffusion layer 14 placed on the front side of the light guide plate 12 and emerge forward. The device 10 also reflects and returns the remaining light to the rear side using the diffusion layer 14, and causes the return light to be transmitted through the light guide plate 12 and emerge from the rear surface 12c. The device 10 causes at least part of this light to be transmitted through the white semitransparent reflective layer 15 placed on the rear side of the light guide plate 12 and emerge backward.

That is, light emitted from the light-emitting element 11 is incident on the incident end face 12a of the light guide plate 12, and guided in the light guide plate 12 while internally reflected by the front surface 12b and rear surface 12c of the light guide plate 12, as indicated by the arrows in FIG. 1.

The internal reflection of light that has entered the light guide plate 12 from the incident end face 12a is caused by total reflection on the interfaces between the front surface 12b and rear surface 12c of the light guide plate and the air layer which is the open air; light incident on the interface at an incident angle equal to or larger than the total reflection critical angle is reflected, and light incident on the interface at an angle smaller than the total reflection critical angle is transmitted through the interface and emerges.

In this embodiment, since the rear surface 12c of the light guide plate 12 is the diffusion layer formed from the above embossed surface, light internally reflected by the rear surface 12c is diffused, and the diffused/reflected light is incident on the interface between the front surface 12b of the light guide plate and the air layer.

As a consequence, most of the light that enters the light guide plate 12 from the incident end face 12a is incident on the interface between the front surface 12b and the air layer at an incident angle smaller than the total reflection critical angle and hence is transmitted through the interface and emerges from the front surface 12b of the light guide plate in the process of being guided into the light guide plate 12 while internally reflected by the front surface 12b and rear surface 12c of the light guide plate 12.

Of the light that enters the light guide plate 12 from the incident end face 12a, light incident on the interface between the rear surface 12c of the light guide plate 12 and the air layer at an incident angle smaller than the total reflection critical angle is transmitted through the interface and emerges to the rear side of the light guide plate 12.

The light emerging from the front surface 12b of the light guide plate 12 is incident on the diffusion layer 14 placed on the front side of the light guide plate 12 to be diffused. Of the light, diffused light propagating toward the front surface of the diffusion layer 14 is transmitted through the diffusion layer 14 and emerges from the front surface.

The diffused light emerging from the front surface of the diffusion layer 14 is incident on the prism sheet 16 placed on the front side of the diffusion layer 14, and is refracted by the oblong prism portions 16a in a direction near the normal to the front surface 12b of the light guide plate 12. The light then emerges from the front surface of the prism sheet 16 to the front side.

The light emerging to the front side is light having a uniform luminance distribution and directivity in the front-surface direction (a direction near the normal to the front surface 12b of the light guide plate 12), which has been diffused by the diffusion layer 14 and further refracted by the prism sheet 16 in a direction near the normal to the front surface 12b of the light guide plate 12.

Of the light that has emerged from the front surface 12b of the light guide plate 12 and has been diffused by the diffusion layer 14, diffused light propagating toward the rear surface of the diffusion layer 14 emerges from the rear surface of the diffusion layer 14 and returns to the rear side.

This return light enters the light guide plate 12 from the front surface 12b, is transmitted through the light guide plate 12, and emerges from the rear surface 12c to the rear side.

Of the return light that has been transmitted through the light guide plate 12 and has emerged to the rear side and the light that has entered the light guide plate 12 from the incident end face 12a, light emerging to the rear side of the light guide plate 12 is incident on the white semitransparent reflective layer 15 placed on the rear side of the light guide plate 12. Of this light, the amount of light corresponding to the reflectance of the white semitransparent reflective layer 15 is reflected by the white semitransparent reflective layer 15, and the amount of light corresponding to the transmittance of the white semitransparent reflective layer 15 is transmitted through the white semitransparent reflective layer 15 and emerges to the rear side.

The light emerging to the rear side is white light having a uniform luminance distribution, which has been diffused by the diffusion layer 14 and transmitted through the white semitransparent reflective layer 15.

The light reflected by the white semitransparent reflective layer 15 again enters the light guide plate 12 from the rear surface 12c and is transmitted through the light guide plate 12. The light then emerges from the front surface 12b and strikes the diffusion layer 14 again.

As described above, the light that has struck the diffusion layer 14 again is diffused by the diffusion layer 14 again. Of this light, diffused light propagating toward the front surface of the diffusion layer 14 emerges from the front surface of the diffusion layer 14, is refracted by the prism sheet 16 in a direction near the normal to the front surface 12b of the light guide plate 12, and emerges from the front surface of the prism sheet 16 to the front side.

As described above, of the light that has beer incident on the diffusion layer 14 again and diffused again, return light emerging from the rear surface of the diffusion layer 14 is transmitted through the light guide plate 12 and incident on the white semitransparent reflective layer 15. Of this light, the amount of light corresponding to the reflectance of the white semitransparent reflective layer 15 is reflected by the white semitransparent reflective layer 15, and the amount of light corresponding to the transmittance of the white semitransparent reflective layer 15 is transmitted through the white semitransparent reflective layer 15 and emerges to the rear side.

As described above, the surface light source device 10 makes the diffusion layer 14 diffuse light which is emitted from the light-emitting element 11, enters the light guide plate 12 from the incident end face 12a, and emerges from the front surface 12b of the light guide plate 12, and causes part of the diffused light to emerge to the front side of the diffusion layer 14 while returning the remaining diffused light to the rear side. The device 10 causes the return light to be transmitted through the light guide plate 12 and incident on the white semitransparent reflective layer 15. The device 10 then causes part of the light to be transmitted through the white semitransparent reflective layer 15 and emerge to the rear side. According to the surface light source device 10, light can be made to emerge to the two sides, i.e., the front side and the rear side.

The luminance ratio of light emerging to the front side to light emerging to the rear side of the surface light source device 10 can be arbitrarily set by selecting degrees of diffusion in the forward and backward directions of the diffusion layer 14 and a reflectance and transmittance of the white semitransparent reflective layer 15.

In this embodiment, the diffusion layer 14 that receives incident light and causes its diffused light to emerge from both one surface and the other surface is placed on the front side of the light guide plate 12 as the first optical element which transmits part of light emerging from the front surface 12b of the light guide plate 12 and returns the remaining light to the rear side, and the white semitransparent reflective layer 15 is placed on the rear side of the light guide plate 12 as the second optical element which transmits at least part of light emerging from the rear surface 12c of the light guide plate 12. This makes it possible to make light having a uniform luminance distribution emerge to the front side and colorless, white light having a uniform luminance distribution emerge to the rear side.

In addition, in this embodiment, since the rear surface 12c of the light guide plate 12 is formed into a diffusion surface that diffuses light internally reflected by the rear surface 12c, light entering the light guide plate 12 from the incident end face 12a can be made to efficiently emerge from the front surface 12b of the light guide plate 12.

Furthermore, in this embodiment, since the prism sheet 16 serving as a refracting layer that refracts light emerging to the front side of the diffusion layer 14 in a direction near the normal to the front surface 12b of the light guide plate 12 is placed on the front side of the diffusion layer 14 placed on the front side of the light guide plate 12, light having directivity in the front-surface direction can be made to emerge to the front side.

Second Embodiment

Figure 2:
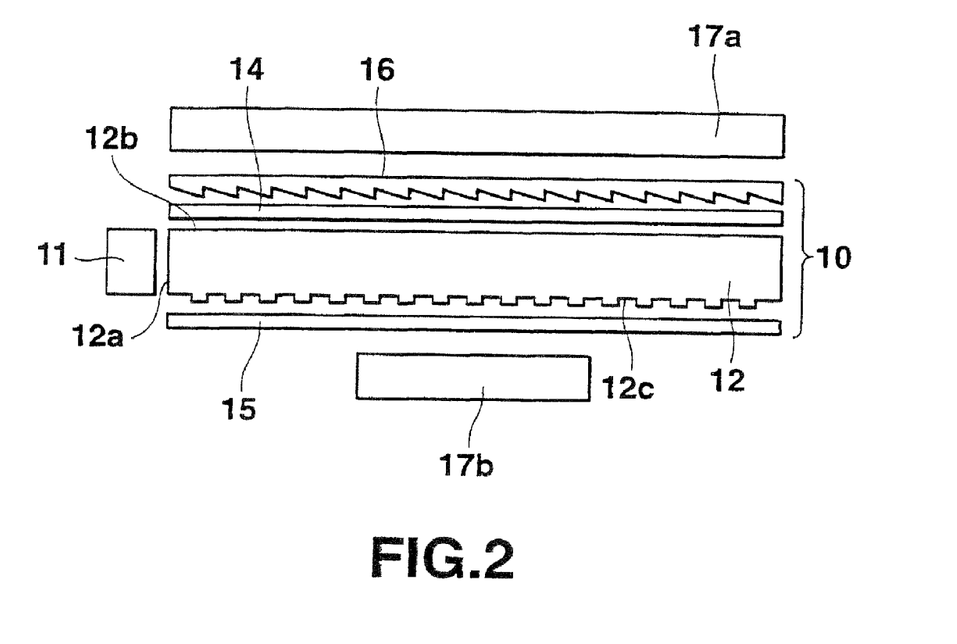
FIG. 2 is a side view of a display device according to the second embodiment of the present invention.
Figure 3:
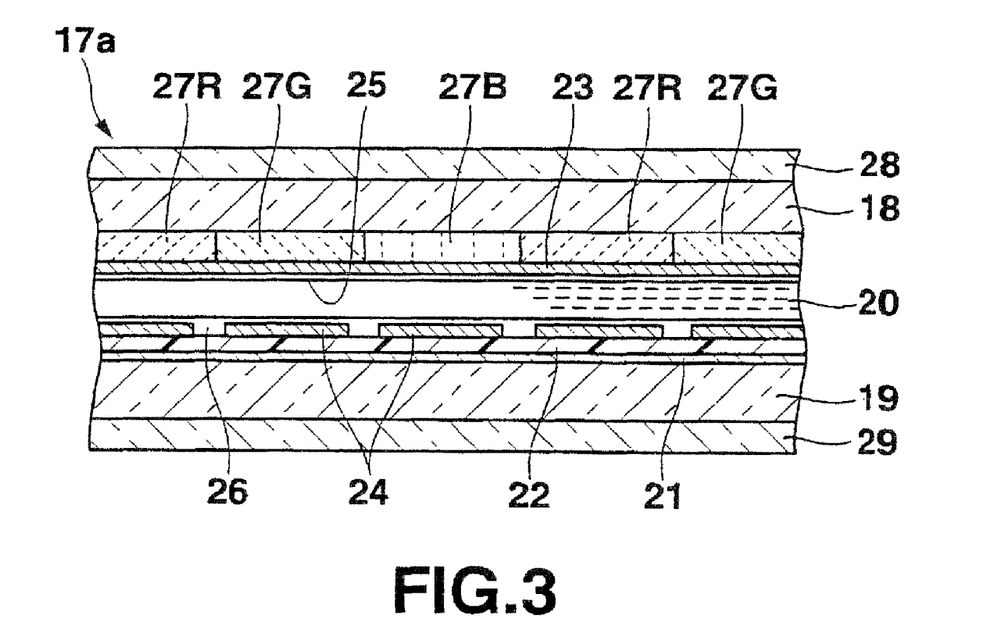
FIG. 3 is an enlarged sectional view showing part of the first display element in the display device shown in FIG. 2.
Figure 4:
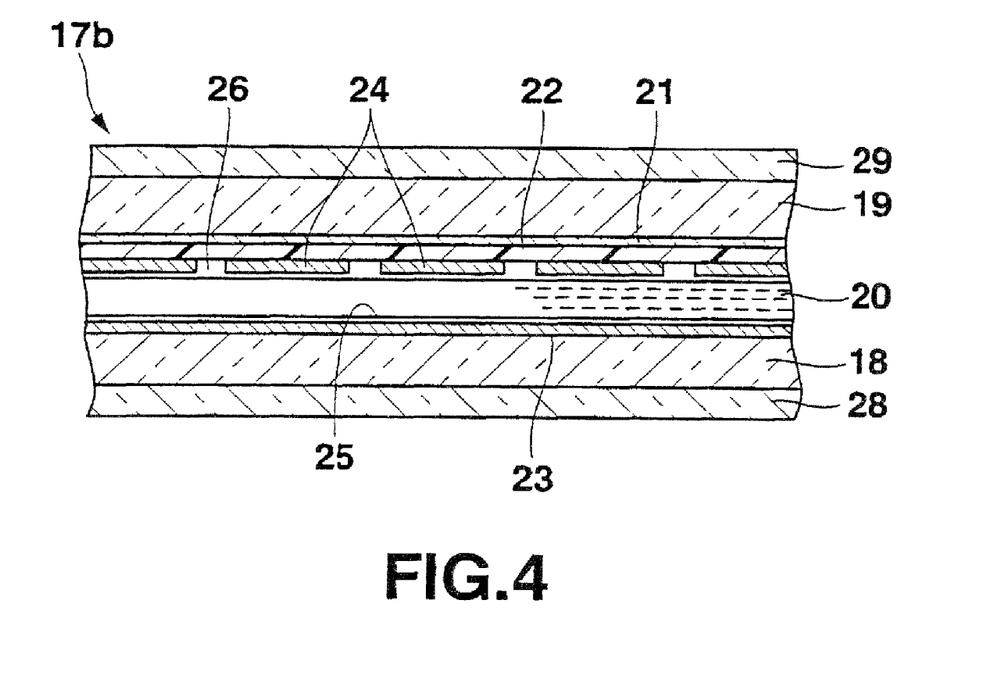
FIG. 4 is an enlarged sectional view showing part of the second display element in the display device shown in FIG. 2.
Figure 5A:
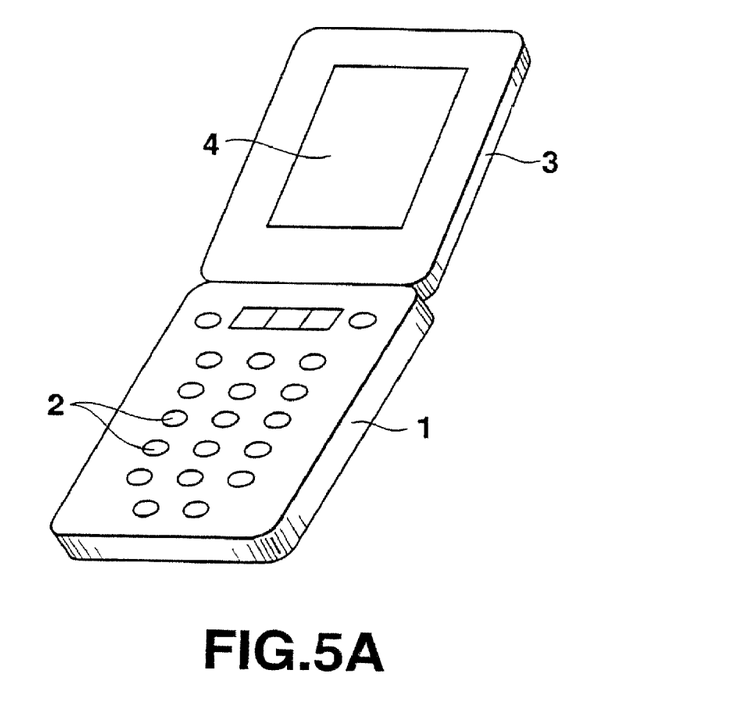
FIGS. 5A and 5B are perspective views showing an example of electronic equipment having the above display device in different conditions.
Figure 5B:
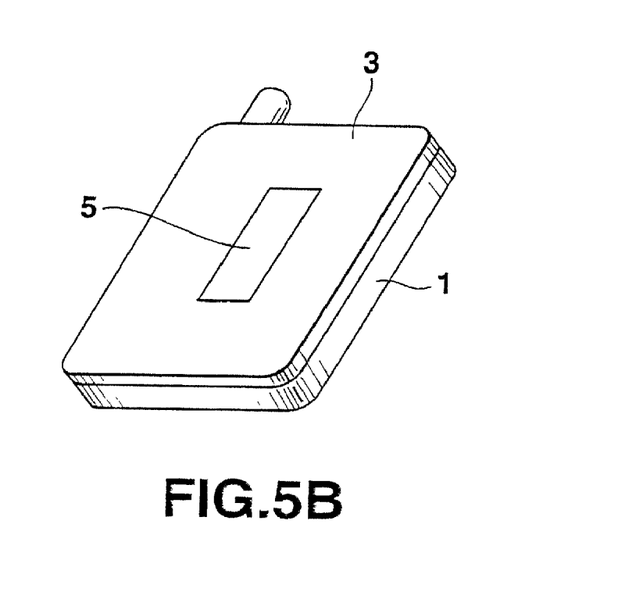

FIG. 2 shows a display device using a surface light source device according to the present invention. FIGS. 3 and 4 are sectional views showing portions of the first and second display elements used in the display device. FIGS. 5A and 5B show an example of an electronic equipment having the display device.

In the second embodiment, a display device is formed by placing the first and second display elements on the two sides of the above surface light source device, and the display device is applied to electronic equipment such as a cell phone.

The electronic equipment shown in FIGS. 5A and 5B will be described first. This electronic equipment is a cell phone, which includes an equipment body 1 having a plurality of keys 2 on its front surface, and a lid member 3 which has one end pivotally supported on the upper edge portion of the equipment main body 1 so as to be openable/pivotal with respect to the equipment main body 1. In this phone, a main display section 4 for displaying main information such as telephone numbers and electronic mail is provided on the front surface of the lid member 3, i.e., the surface that is located in the same direction as that of the front surface of the equipment main body 1 when the lid member 3 is opened as shown in FIG. 5A, and faces the equipment main body 1 when the lid member 3 is closed as shown in FIG. 5B. A sub-display section 5 having a small screen which displays the time, the arrival of an incoming call, and the like is provided on the rear surface of the lid member 3.

The display device shown in FIG. 2 will be described below. This display device includes the surface light source device 10 described above, a first display element 17a which is placed on the front side of the surface light source device 10 so as to make the surface on the opposite side to the display observation side face the surface light source device 10 and displays an image upon controlling the transmission of light, and a second display element 17b which is placed on the rear side of the surface light source device 10 so as to make the surface on the opposite side to the display observation side face the surface light source device 10 and displays an image upon controlling the transmission of light.

The first and second display elements 17a and 17b are, for example, liquid crystal display devices. The first display element 17a serves as a main display element. The second display element 17b serves as sub-display element.

According to this display device, in the lid member 3 of the electronic equipment (cell phone) shown in FIGS. 5A and 5B, the first display element or main display element 17a serving as a main display element is mounted to face the main display section 4 on the front surface of the lid member 3. The second display element or sub-display element 17b serving as a sub-display element is mounted to face the sub-display section 5 on the rear surface of the lid member 3. The main display element 17a is a liquid crystal display element having a screen size corresponding to the main display section 4 of the lid member 3. The sub-display element 17b is a liquid crystal display element having a screen size corresponding to the small-screen sub-display section 5 of the lid member 3. The light guide plate 12, diffusion layer 14, prism sheet 16, and white semitransparent reflective layer 15 of the surface light source device 10 described above each have an area substantially corresponding to the entire region of the screen of the main display element 17a. That is, these members have almost the same area in the planar direction.

FIG. 3 is a sectional view of part of the main display element or unit 17a. FIG. 4 is a sectional view of part of the sub-display element or unit 17b.

The main display element 17a and sub-display element 17b are reflection/transmission type display devices each having a semitransparent reflective film 21 on the opposite side to the observation side of display. As shown in FIGS. 3 and 4, in each of these display devices, a liquid crystal layer 20 is placed between a transparent substrate 18 on the front side which is the observation side of display and a transparent substrate 19 on the rear side which is opposite to the front-side substrate 18. The semitransparent reflective film 21 is placed on the rear side of the liquid crystal layer 20. Polarizing plates 28 and 29 are arranged on the front side of the liquid crystal layer 20 and the rear side of the semitransparent reflective film 21, respectively.

The semitransparent reflective film 21 is made of, for example, a porous metal film, and formed on the inner surface (opposite to the front-side substrate 18) of the rear-side substrate 19.

The front-side substrate 18 is joined to the rear-side substrate 19 through a frame-like seal member (not shown) at their peripheral portions. The liquid crystal layer 20 is placed in a region surrounded by the seal member between the front and rear substrates 18 and 19.

The main display element 17a and sub-display element 17b are STN (supertwisted nematic) type simple matrix liquid crystal display devices. In each device, a plurality of transparent scanning electrodes 23 extending along the row direction (the horizontal direction in FIGS. 3 and 4) are formed on the inner surface of one substrate, e.g., the front-side substrate 18 (the surface opposite to the rear-side substrate 19), so as to be spaced apart from each other in the column direction, and transparent signal electrodes 24 extending along the column direction (the direction perpendicular to the drawing surface in FIGS. 3 and 4) are formed on the inner surface of the rear-side substrate 19 so as to be spaced apart from each other in the row direction.

A transparent insulating film 22 is formed on the inner surface side of the rear-side substrate 19 so as to cover the semitransparent reflective film 21. The signal electrodes 24 are formed on the insulating film 22.

Aligning films 25 and 26 are respectively formed on the innermost surface sides of the front-side substrate 18 and rear-side substrate 19 so as to cover the electrodes 23 and 24. The aligning direction of the liquid crystal molecules of the liquid crystal layer 20 which are located near the front and rear substrates 18 and 19 is defined by the aligning films 25 and 26, and the liquid crystal molecules are twisted/aligned at a twist angle of 220 to 260° between the front and rear substrates 18 and 19.

The polarizing plates 28 and 29 are absorption polarizing plates each designed to absorb one of two orthogonal linearly polarized light components of incident light and transmit the other polarized light component. The front-side polarizing plate 28 is bonded to the outer surface of the front-side substrate 18 with the transmission axis of the plate being oriented in a predetermined direction. The rear-side polarizing plate 29 is bonded to the outer surface of the rear-side substrate 19 with the transmission axis of the plate being oriented in a predetermined direction.

The main display element 17a is, for example, a color image display unit having, on the inner surface of one substrate, e.g., the front-side substrate 18, color filters 27R, 27G, and 27B of a plurality of colors, e.g., three colors of red, green, and blue, corresponding to a plurality of pixel portions where the scanning electrodes 23 and signal electrodes 24 oppose each other. These color filters are formed on the substrate surface of the front-side substrate 18. The scanning electrodes 23 are formed on the filters.

The sub-display element 17b is, for example, a monochrome image display unit having no color filter.

The main display element 17a is placed on the front side of the surface light source device 10 such that the rear surface (the outer surface of the rear-side polarizing plate 29) of the main display element 17a opposes a light exit region on the front surface 12b of the light guide plate 12 of the surface light source device 10. The sub-display element 17b is placed on the rear side of the surface light source device 10 such that the rear surface (the outer surface of the rear-side polarizing plate 29) of the sub-display element 17b opposes a portion near the center of a light exit region on the rear surface 12c of the light guide plate 12 of the surface light source device 10.

This display device is designed to perform display on the two display surfaces, i.e., one surface on which the main display element 17a is placed and the other surface on which the sub-display element 17b is placed. The main display element 17a is driven when the surface on which it is placed serves as a display surface. The sub-display element 17b is driven when the surface on which it is placed serves as a display surface.

This display device is designed to perform transmission display using light from the surface light source device 10 under an environment where external light with sufficient brightness cannot be obtained, and to perform reflection display using external light under an environment where external light with sufficient brightness can be obtained. The light-emitting element 11 of the surface light source device 10 is turned off when reflection display is performed, and turned on when transmission display is performed.

Display operation of this display device will be described by exemplifying display operation using the main display element 17a. When transmission display using light from the surface light source device 10 is to be performed, light which emerges on the front side of the surface light source device 10 and is incident on the main display element 17a from its rear side is converted into linearly polarized light along the transmission axis of the rear-side polarizing plate 29 after a polarized light component along the absorption axis of the rear-side polarizing plate 29 of the main display element 17a is absorbed by the rear-side polarizing plate 29. This light is then transmitted through the semitransparent reflective film 21 and incident on the liquid crystal layer 20.

The polarizing stat of the linearly polarized light incident on the liquid crystal layer 20 is changed, in the process of being transmitted through the liquid crystal layer 20, by being subjected to a birefringence effect corresponding to the aligned state of the liquid crystal molecules which is changed by an electric field applied between the electrodes 23 and 24 at each pixel portion. In addition, light components of the light which have wavelengths falling in the absorption wavelength bands of the color filters 27R, 27G, and 27B are absorbed by them. The resultant colored light is incident on the front-side polarizing plate 28. If the linearly polarized light incident on the front-side polarizing plate 28 is linearly polarized light along the absorption axis of the front-side polarizing plate 28, the light is absorbed by the polarizing plate 28. As a consequence, display on the corresponding pixel portion becomes dark display (black). If this light is linearly polarized light along the transmission axis of the front-side polarizing plate 28, the light is transmitted through the polarizing plate 28 and emerges to the front side. As a consequence, display on the corresponding pixel portion becomes bright display of a color corresponding to one of the color filters 27R, 27G, and 27B which is formed on the pixel portion.

When reflection display using external light is to be performed, light incident on the main display element 17a from the front side which is the observation surface side of display is converted into linearly polarized light along the transmission axis of the front-side polarizing plate 28 of the main display element 17a after a polarized light component along the absorption axis of the front-side polarizing plate 28 is absorbed by the front-side polarizing plate 28. The light is then transmitted through the color filters 27R, 27G, and 27B. The resultant colored light is incident on the liquid crystal layer 20.

The light incident on the liquid crystal layer 20 is subjected to a birefringence effect corresponding to the aligned state of liquid crystal molecules at each pixel portion in the process of being transmitted through the liquid crystal layer 20. The resultant light is reflected by the semitransparent reflective film 21 formed on the inner surface of the rear-side substrate 19.

The light reflected by the semitransparent reflective film 21 is transmitted through the liquid crystal layer 20 and color filters 27R, 27G, and 27B again to strike the front-side polarizing plate 28 again. If the linearly polarized light incident on the front-side polarizing plate 28 again is linearly polarized light along the absorption axis of the front-side polarizing plate 28, the light is absorbed by the polarizing plate 28, and display of the corresponding pixel portion becomes dark display (black). If the light is linearly polarized light along the transmission axis of the front-side polarizing plate 28, the light is transmitted through the polarizing plate 28 to emerge to the front side. As a consequence, display of the corresponding pixel portion becomes bright colored display.

Display operation using the main display element 17a has been described above. Transmission display and reflection display using the sub-display element 17b are basically the same as those using the main display element 17a. The sub-display element 17b has no color filter, and hence bright display performed by this display element is colorless, white display.

That is, in this display device, the main display element 17a and sub-display element 17b are arranged on the front and rear sides of the surface light source device 10 from which light emerges to the two sides, i.e., the front and rear sides, and light emerging to the front side of the surface light source device 10 is incident on the main display element 17a to make the main display element 17a perform display, while light emerging to the rear side of the surface light source device 10 is incident on the sub-display element 17b to make the sub-display element 17b perform display. This display device can perform display operation using, as display surfaces, both one surface on which the main display element 17a is placed and the other surface on which the sub-display element 17b is placed by using one surface light source device 10.

In this display device, the main display element 17a is a color image display element having the color filters 27R, 27G, and 27B. As described above, however, the surface light source device 10 causes light having a luminance than that of light emerging to the rear side to emerge to the front side, and hence a color image with sufficient brightness can be displayed on the main display element 17a by causing the light having a sufficient luminance to be incident on the main display element 17a.

The sub-display element 17b is a monochrome image display element having no color filter, and hence no light is absorbed by color filters. Even if, therefore, the luminance of light emerging to the rear side of the surface light source device 10 is low, a monochrome image with sufficient brightness can be displayed on the sub-display element 17b.

In addition, since the surface light source device 10 causes light diffused by the diffusion layer 14 and refracted by the prism sheet 16 to emerge, the main display element 17a can be made to perform display operation with sufficient front luminance without any luminance irregularity.

Furthermore, since the surface light source device 10 causes light that is diffused by the diffusion layer 14, returns to the rear side, and is transmitted through the white semitransparent reflective layer 15 to emerge to the rear side, the sub-display element 17b can be made to perform colorless display without any luminance irregularity.

The display device of this embodiment uses reflection/transmission type display devices as the main display element 17a and sub-display element 17b, each of which has the semitransparent reflective film 21 on the opposite side to the observation side of display and performs both transmission display using light emerging from the surface light source device 10 and reflection display using external light incident from the observation surface of display. Therefore, the main display element 17a and sub-display element 17b each can be made to perform transmission display using light from the surface light source device 10 and reflection display using external light.

In this embodiment, the main display element 17a and sub-display element 17b each have the semitransparent reflective film 21 between the liquid crystal layer 20 and the rear-side polarizing plate 29, and reflection display using external light is performed by using only one front-side polarizing plate 28. In this arrangement, therefore, the amount of light absorbed by the polarizing plate in reflection display can be decreased, and the brightness of reflection display can be increased as compared with a case wherein the semitransparent reflective film 21 is placed on the rear side of the rear-side polarizing plate 29.

In this embodiment, the main display element 17a and sub-display element 17b each have the semitransparent reflective film 21 formed on the inner surface of the rear-side substrate 19. This arrangement can decrease the distance from the display surface (the front surface of the front-side polarizing plate 28) of each of the display elements 17a and 17b to the semitransparent reflective film 21, and hence prevents the generation of a double image, which is generated when an actually displayed image shifts from a shadow of the displayed image which is projected on the semitransparent reflective film 21, thereby displaying a high-quality image.

Third Embodiment

Figure 6:
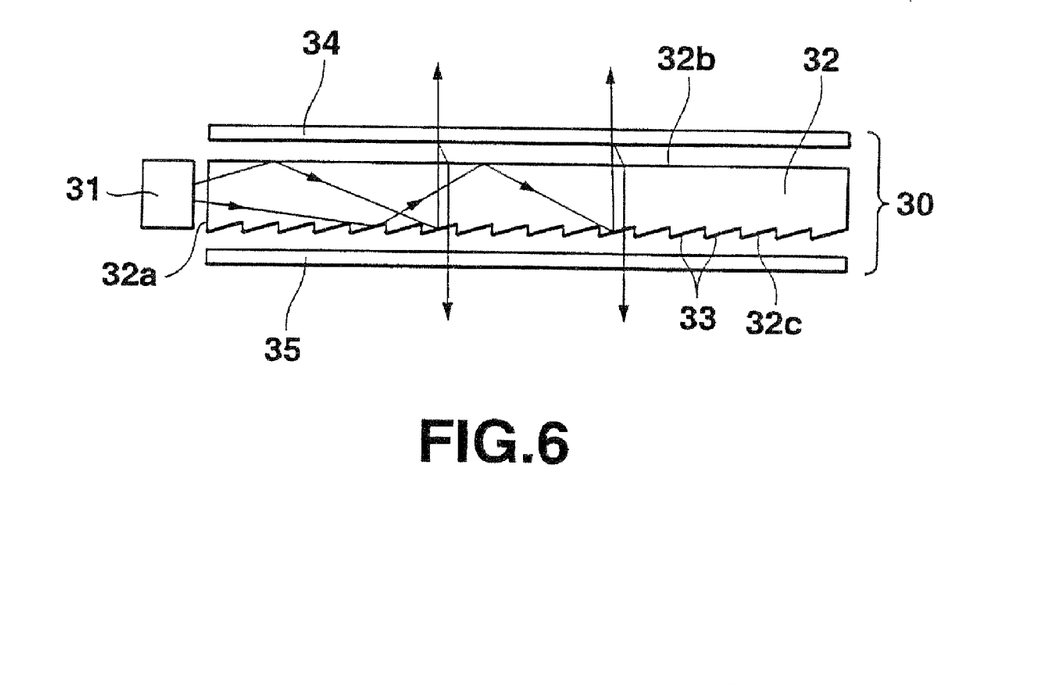
FIG. 6 is a side view showing a surface light source according to the third embodiment of the present invention.

FIG. 6 shows a side surface of a surface light source device according to the third embodiment of the present invention.

As shown in FIG. 6, a surface light source device 30 of this embodiment includes a light-emitting element 31, and a light guide plate 32. The guide plate 32 causes light emitted from the light-emitting element 31 to be incident from an end face of the light guide plate, causes most of the light to emerge from the front surface by guiding the light while internally reflecting it by the front and rear surfaces, and transmits light incident from the front and rear surfaces. The device further includes a first optical element 34 which is placed on the front side of the light guide plate 32, transmits part of the light emerging from the front surface of the light guide plate 32, and returns the remaining light to the rear side (light guide plate 32 side), and a second optical element 35 which is placed on the rear side of the light guide plate 32 and transmits at least part of the light emerging from the rear surface of the light guide plate 32.

The light-emitting element 31 is identical to the light-emitting element 11 of the surface light source device 10 of the first embodiment described above, and hence a description thereof will be omitted.

The light guide plate 32 is a transparent plate made of, for example, an acrylic resin, and has one end surface serving as an incident end face 32a on which light emitted from the light-emitting element 31 is incident. One front surface 32b of the light guide plate 32 is formed into a flat surface. A rear surface 32c is formed into a reflecting/refracting surface which refracts light internally reflected by the rear surface 32c in a direction in which an angle with respect to the normal to the front surface 32b of the light guide plate 32 becomes smaller than that in a case wherein light is regularly reflected by a surface parallel to the front surface 32b (to be simply referred to as a direction in which an angle with respect to the normal decreases hereinafter).

In this embodiment, the rear surface 32c of the light guide plate 32 is formed into a reflecting/refracting surface in the form of a prism sheet on which narrow, oblong prism portions 33 are densely arrayed parallel to each other throughout the entire region.

The first optical element 34 placed on the front side of the light guide plate 32 and the second optical element 35 placed on the rear side of the light guide plate 32 are reflecting/polarizing layers each designed to reflect one of two orthogonal polarized light components of incident light and transmit the other polarized light component. For example, each of these optical elements is a reflection polarizing plate having a reflection axis and transmission axis in orthogonal directions. The first optical element 34 on the front side of the light guide plate 32 and the second optical element 35 on the rear side of the light guide plate 32 will be referred to as a front-side reflection polarizing plate and a rear-side reflection polarizing plate, respectively.

The front-side reflection polarizing plate 34 and rear-side reflection polarizing plate 35 are arranged such that directions (reflection axis directions) parallel to the planes of polarization of reflected light become substantially perpendicular to each other so as to make light reflected by one reflection polarizing plate be transmitted through the other reflection polarizing plate.

The surface light source device 30 of this embodiment causes light emitted from the light-emitting element 31 and incident from the incident end face 32a of the light guide plate 32 to emerge from the front surface 32b of the light guide plate 32. The device 30 causes part of the light to be transmitted through the front-side reflection polarizing plate 34 placed on the front side of the light guide plate 32 and emerge forward. The device 30 also reflects and returns the remaining light to the rear side using the front-side reflection polarizing plate 34, and causes the return light to be transmitted through the light guide plate 32 and emerge from the rear surface 32c. The device 30 causes at least part of this light to be transmitted through the rear-side reflection polarizing plate 35 placed on the rear side of the light guide plate 32 and emerge backward.

That is, light emitted from the light-emitting element 31 is incident on the incident end face 32a of the light guide plate 32, and guided into the light guide plate 32 while internally reflected by the front surface 32b and rear surface 32c of the light guide plate 32, as indicated by the arrows in FIG. 6.

The internal reflection of light that enters the light guide plate 32 from the incident end face 32a is caused by total reflection on the interfaces between the front surface 32b and rear surface 32c of the light guide plate and the air layer which is the open air. Light incident on the interface at an incident angle equal to or larger than the total reflection critical angle is reflected and light incident on the interface at an angle smaller than the total reflection critical angle is transmitted through the interface and emerges.

In this embodiment, since the rear surface 32c of the light guide plate 32 is the reflecting/refracting surface in the form of a prism sheet, light internally reflected by the rear surface 32c is refracted in the direction in which the angle with respect to the normal to the front surface 32b of the light guide plate 32 decreases, and the reflected light is incident on the interface between the front surface 32b of the light guide plate and the air layer.

As a consequence, the light that enters the light guide plate 32 from the incident end face 32a is incident on the interface between the front surface 32b and the air layer at an incident angle smaller than the total reflection critical angle and hence is transmitted through the interface and emerges from the front surface 32b of the light guide plate in the process of being guided into the light guide plate 32 while internally reflected by the front surface 32b and rear surface 32c of the light guide plate 32.

Of the light that enters the light guide plate 32 from the incident end face 32a, light incident on the interface between the rear surface 32c of the light guide plate 32 and the air layer at an incident angle smaller than the total reflection critical angle is transmitted through the interface and emerges to the rear side of the light guide plate 32.

The light emerging from the front surface 32b of the light guide plate 32 is incident on the front-side reflection polarizing plate 34 placed on the front side of the light guide plate 32. Of the light, a polarized light component along the transmission axis of the front-side reflection polarizing plate 34 is transmitted through the front-side reflection polarizing plate 34 and emerges from the front surface to the front side.

The light emerging to the front side is the light that has emerged from the front surface 32b of the light guide plate 32, entered the light guide plate 32 from the incident end face 32a, and has been refracted in the direction in which the angle with respect to the normal to the light guide plate front surface 32b decreases by the light guide plate rear surface 32c formed into the reflecting/refracting surface in the form of a prim sheet so as to be internally reflected. This light therefore has directivity in the front-surface direction (a direction near the normal to the front surface 32b of the light guide plate 32).

Of the light that has emerged from the front surface 32b of the light guide plate 32 and struck the front-side reflection polarizing plate 34, a polarized light component along the reflection axis of the front-side reflection polarizing plate 34 is reflected by the front-side reflection polarizing plate 34 to return to the rear side.

This return light is transmitted through the light guide plate 32 and emerges to the rear side. The light is further transmitted through the rear-side reflection polarizing plate 35 placed on the rear side of the light guide plate 32 and emerges to the rear side.

That is, since the front-side reflection polarizing plate 34 and rear-side reflection polarizing plate 35 are arranged such that the respective reflection axes are perpendicular to each other, the return light reflected by the reflection polarizing plate 34 is a linearly polarized light component along the transmission axis of the rear-side reflection polarizing plate 35. Most of the return light is therefore transmitted through the rear-side reflection polarizing plate 35 and emerges to the rear side.

The light emerging to the rear side is part of the light that has emerged from the front surface 32b of the light guide plate 32 with directivity in the front-surface direction and has been reflected by the front-side reflection polarizing plate 34, and hence is light having directivity in the rear-surface direction opposite to the front-surface direction.

As described above, part of light entering the light guide plate 32 from the incident end face 32a emerges to the rear side of the light guide plate 32. This light is, however, incident on the rear-side reflection polarizing plate 35. Of the light, a polarized light component along the transmission axis of the rear-side reflection polarizing plate 35 is transmitted through the rear-side reflection polarizing plate 35 and emerges to the rear side, whereas a polarized light component along the reflection axis of the rear-side reflection polarizing plate 35 is reflected by the rear-side reflection polarizing plate 35 to be transmitted through the front-side reflection polarizing plate 34 and emerge to the front side.

As described above, the surface light source device 30 causes part of light that is emitted from the light-emitting element 31, enters the light guide plate 32 from the incident end face 32a, and emerges from the front surface 32b of the light guide plate 32 to be transmitted through the front-side reflection polarizing plate 34 and emerge to the front side. In addition, the device 30 causes the front-side reflection polarizing plate 34 to reflect the remaining light and return it to the rear side, and causes the return light to be transmitted through the light guide plate 32. The device 30 further causes this light to be transmitted through the rear-side reflection polarizing plate 35 and emerge to the rear side. According to the surface light source device 30, light can be made to emerge to both the front side and the rear side.

In the surface light source device 30 of this embodiment, as the first and second optical elements respectively placed on the front and rear sides of the light guide plate 32, the reflection polarizing plates 34 and 35 are used, each of which is designed to reflect one of two orthogonal linearly polarized light components of incident light and transmit the other polarized light component. This arrangement allows most of light that is emitted from the light-emitting element 31 and enters the light guide plate 32 from the incident end face 32a to be substantially equally distributed and emerge to the front and rear sides without any loss.

In addition, in this embodiment, since the rear surface 32c of the light guide plate 32 is formed into the reflecting/refracting surface that refracts light internally reflected by the rear surface 32c in a direction in which an angle with respect to the normal to the front surface 32b of the light guide plate 32 decreases, most of light entering the light guide plate 32 from the incident end face 32a can be made to emerge from the front surface 32b of the light guide plate 32 in a direction near the normal to the front surface 32b, thereby causing light having directivity in the front-surface direction or its opposite direction to emerge to both the front side and the rear side.

Fourth Embodiment

Figure 7:
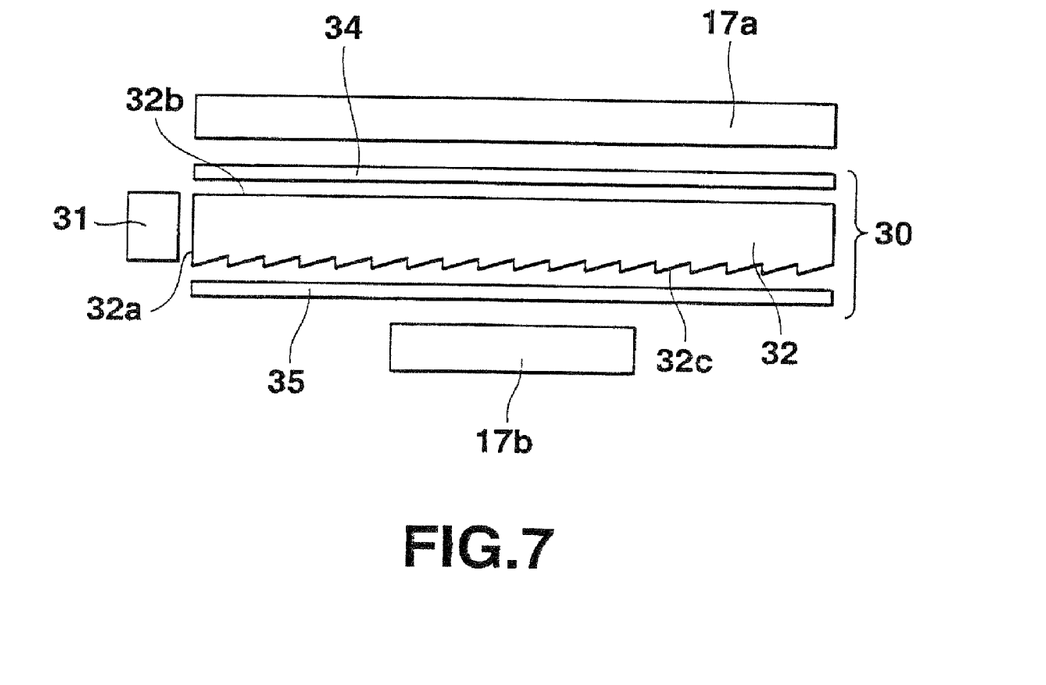
FIG. 7 is a side view showing a display device according to the fourth embodiment of the present invention.

The fourth embodiment of the present invention will be described next. FIG. 7 shows a side surface of a display device using the surface light source device according to the third embodiment. In this display device, a reflection/transmission type main display element (first display element) 17a for displaying a color image, which is shown in FIG. 3, is placed on the front side of the surface light source device 30 of the third embodiment described above such that the surface on the opposite side to the observation side of display is placed to face the surface light source device 30, and the transmission axis of a rear-side polarizing plate 29 becomes substantially parallel to the transmission axis of a front-side reflection polarizing plate 34 of the surface light source device 30. In addition, a reflection/transmission type sub-display element (second display element) 17b for displaying a monochrome image, which is shown in FIG. 14, is placed on the rear side of the surface light source device 30 such that the surface on the opposite side to the observation side of display faces the surface light source device 30, and the transmission axis of the rear-side polarizing plate 29 becomes substantially parallel to the transmission axis of a rear-side reflection polarizing plate 35 of the surface light source device 30.

That is, in this display device, the first display element 17a and sub-display element 17b are respectively arranged on the front and rear sides of the surface light source device 30 which causes light to emerge to both the front side and the rear side. In this arrangement, light emerging to the front side of the surface light source device 30 is made incident on the first display element 17a to make it perform display operation, and light emerging to the rear side of the surface light source device 30 is made incident on the sub-display element 17b to make it perform display operation. This display device can perform display operation by using, as display surfaces, both one surface on which the first display element 17a is placed and the other surface on which the sub-display element 17b is placed.

As described above, in the display device of this embodiment, the transmission axis of the rear-side polarizing plate 29 of the first display element 17a placed on the front side of the surface light source device 30 is made substantially parallel to the transmission axis of the front-side reflection polarizing plate 34 of the surface light source device 30, and the transmission axis of the rear-side polarizing plate 29 of the sub-display element 17b is made substantially parallel to the transmission axis of the rear-side reflection polarizing plate 35 of the surface light source device 30. For this reason, light emerging to the front side of the surface light source device 30, i.e., linearly polarized light along the transmission axis of the front-side reflection polarizing plate 34, can be efficiently transmitted through the rear-side polarizing plate 29 of the main display element 17a and made incident on a liquid crystal layer 20 of the main display element 17a. In addition, light emerging to the rear side of the surface light source device 30, i.e., linearly polarized light along the transmission axis of the rear-side reflection polarizing plate 35, can be efficiently transmitted through the rear-side polarizing plate 29 of the sub-display element 17b and made incident on the liquid crystal layer 20 of the sub-display element 17b.

In the display device of this embodiment, as described above, the surface light source device 30 causes light emitted from a light-emitting element 31 to be substantially equally distributed and emerge to the front and rear sides, and also causes light to emerge with directivity in the front-surface direction or the rear-surface direction opposite to the front-surface direction. This allows both the main display element 17a and the sub-display element 17b to perform display operation with sufficient brightness and sufficient front luminance.

In the display device of this embodiment, the main display element 17a and sub-display element 17b are reflection/transmission type display devices each having a semitransparent reflective film 21 on the opposite side to the observation side of display. This arrangement allows each of the main display element 17a and the sub-display element 17b to perform both transmission display using light from the surface light source device 30 and reflection display using external light.

This embodiment uses reflection/transmission type display devices, each having a semitransparent reflective film with the same arrangement as that in the second embodiment, as the main display element 17a and sub-display element 17b. However, the present invention is not limited to this. If the reflection polarizing plates 34 and 35 arranged on the front and rear sides of a light guide plate 32 are used as reflecting plates for reflection display for the respective display elements 17a and 17b, the respective semitransparent reflective films can be omitted.

In the display device of this embodiment, the main display element 17a and sub-display element 17b each having the polarizing plates (absorption polarizing plates) 28 and 29 on its front and rear sides are arranged on the front and rear sides of the surface light source device 30. However, since the surface light source device 30 causes linearly polarized light along the transmission axis of the front-side reflection polarizing plate 34 to emerge to the front side and causes linearly polarized light along the transmission axis of the rear-side reflection polarizing plate 35 to emerge to the rear side, even if the rear-side polarizing plates 29 are omitted from the main display element 17a and sub-display element 17b, the display elements 17a and 17b can be made to perform display operation.

However, the main display element 17a and sub-display element 17b preferably have the polarizing plates 28 and 29 on the front and rear sides as shown in FIGS. 3 and 4. In this arrangement, the rear-side polarizing plates 29 of the display elements 17a and 17b cause the linearly polarized light emerging to the front and rear sides of the surface light source device 30 to be incident, as linearly polarized light with a high degree of polarization, on the liquid crystal layer 20, thereby increasing the contrasts of display on the display elements 17a and 17b.

In the display device of this embodiment, the main display element 17a placed on the front side of the surface light source device 30 is a color image display element having color filters 27R, 27G, and 27B, and the sub-display element 17b placed on the rear side of the surface light source device 30 is a monochrome image display element having no color filter. However, since the surface light source device 30 causes light emitted from the light-emitting element 31 to be substantially equally distributed and emerge to the front and rear sides, both the main display element 17a and sub-display element 17b may be color image display elements having color filters.

In each of the display devices according to the second and fourth embodiments, each of the main display element 17a and sub-display element 17b is formed such that the semitransparent reflective film 21 is formed on the inner surface of the rear-side substrate 19, and the transparent electrodes 24 are formed on the semitransparent reflective film 21 through the insulating film 22. However, the electrodes 24 may be formed from porous metal films, and each electrode 24 may serve as a semitransparent reflective film.

The semitransparent reflective film 21 may be placed on the outer surface of the rear-side substrate 19 or the rear side of the rear-side polarizing plate 29 as long as the semitransparent reflective film 21 is located on the opposite side to the observation side of display, i.e., the rear side of the liquid crystal layer 20.

The display device of each embodiment described above uses reflection/transmission type display elements as the main display element 17a and sub-display element 17b. However, one or both of the main display element 17a and sub-display element 17b may be transmission type display elements which do not have the semitransparent reflective films 21 and are designed to perform only transmission display.

In the display device of each embodiment described above, both the main display element 17a and the sub-display element 17b are STN type simple matrix liquid crystal display elements. However, these display elements 17a and 17b may be TN (twisted nematic) type, non-twisted, homogeneously aligned, ferroelectric or antiferroelectric liquid crystal display elements or the like or active matrix liquid crystal display elements. Alternatively, they may be display elements other than liquid crystal display elements.

In the surface light source device 10 of the first embodiment shown in FIG. 1, the rear surface 12c of the light guide plate 12 is formed into the diffusion layer for diffusing light internally reflected by the rear surface 12c, and the refracting layer (prism sheet) 16 for refracting light emerging to the front side of the first optical element 14 in a direction near the normal to the front surface 12b of the light guide plate 12 is placed on the front side of the first optical element (diffusion layer) 14 placed on the front side of the light guide plate 12. However, the refracting layer 16 of the first optical element 14 may be omitted by forming the rear surface 12c of the light guide plate 12 into a reflecting/refracting surface for refracting light internally reflected by the rear surface 12c in the direction in which the angle with respect to the normal to the front surface 12b of the light guide plate 12 decreases.

In the surface light source device 30 according to the third embodiment shown in FIG. 6, the rear surface 32c of the light guide plate 32 is formed into a reflecting/refracting surface (in the form of a prism sheet) for refracting light internally reflected by the rear surface 32c in the direction in which the angle with respect to the normal to the front surface 32b of the light guide plate 32 decreases. However, the rear surface 32c of the light guide plate 32 may be formed into a diffusion surface for diffusing light internally reflected by the rear surface 32c, and a refracting layer for refracting light emerging to the front side of the first optical element 34 in a direction near the normal to the front surface 32b of the light guide plate 32 may be placed on the front side of the first optical element (front-side reflection polarizing plate) 34 placed on the front side of the light guide plate 32.

In the surface Light source device 30 of the third embodiment, the first and second optical elements 34 and 35 respectively arranged on the front and rear sides of the light guide plate 32 are reflection polarizing plates each having reflection and transmission axes in orthogonal directions. However, the first and second optical elements 34 and 35 may be other kinds of polarizing/separating layers as long as they can reflect one of two different polarized light components of incident light and transmit the other polarized light component.

For example, polarizing/separating layers used as the first and second optical elements 34 and 35 may be polarizing/separating films (e.g., cholesteric liquid crystal films) or the like which reflect one of two different circularly polarized light components (a clockwise circularly polarized light component and counterclockwise circularly polarized light component) of incident light and transmit the other circularly polarized light component In this case, the polarizing/separating film used as the first optical element 34 and the polarizing/separating film used as the second optical element 35 may be arranged such that light reflected by one polarizing/separating film is transmitted through the other polarizing/separating film.

The above polarizing/separating layer may be formed by stacking retardation plates (λ/4 plates) to sandwich the polarizing/separating film. In this case, linearly polarized light incident on this polarizing/separating layer is converted into circularly polarized light to be incident on the polarizing/separating film, and the circularly polarized light emerging from the polarizing/separating film is converted into linearly polarized light.

In the surface light source device 10 of the first embodiment shown in FIG. 1, the second optical element 15 placed on the rear side of the light guide plate 12 is a white semitransparent reflective layer. In the surface light source device 30 of the third embodiment shown in FIG. 6, the second optical element 35 placed on the rear side of the light guide plate 32 is a reflecting/polarizing layer. However, the second optical elements 15 and 35 may be semitransparent reflective layers formed from porous metal films or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cell phone comprising:
a first casing having a plurality of keys;
a second casing which is pivotally coupled to the first casing, and which includes a first display section adapted to face the first casing and a second display section on an opposite side of the second casing from the first display section; and
a display device mounted on the second casing, the display device comprising:
a flat backlight including a light source which emits light and a light guide plate having an end face facing the light source and two opposing surfaces, wherein the light from the light source is incident on the end face, and is partially guided in the light guide plate while being internally reflected by the two opposing surfaces, so as to partially emerge from the two opposing surfaces;
a first reflection polarizing plate, which is disposed on a side of a first one of the two opposing surfaces, and which partially transmits the light emerged from the first opposing surface toward a front side, and partially returns the light to a rear side;
a second reflection polarizing plate, which is disposed on a side of a second one of the two opposing surfaces, and which transmits at least a part of the light emerged from the second opposing surface;
a first liquid crystal display which faces the first display section of the second casing, and which includes a front side and a back side and two polarizing plates disposed on the front side and the back side, respectively; and
a second liquid crystal display which faces the second display section of the second casing, and which includes a front side and a back side and two polarizing plates disposed on the front side and the back side, respectively.

2. The cell phone according to claim 1, wherein the second liquid crystal display has a smaller display area than a display area of the first liquid crystal display.

3. The cell phone according to claim 1, wherein the first liquid crystal display comprises a color image display and the second liquid crystal display comprises a mono-chrome image display.

4. The cell phone according to claim 1, wherein at least one of the first and second liquid crystal displays comprises an STN type liquid crystal display.

5. The cell phone according to claim 1, wherein a diffusion layer is disposed between one of the first and second liquid crystal displays and the light guide plate.

6. The cell phone according to claim 1, wherein the light guide plate comprises a diffusion surface formed on at least of one of the two opposing surfaces.

7. The cell phone according to claim 1, wherein light emitted from each of the two opposing surfaces of the light guide plate strikes a corresponding one of the first and second reflection polarizing plates, and each of polarized light components along reflection axes of the first and the second reflection polarizing plates is reflected to return to the light guide plate.

8. A cell phone comprising:
a first casing having a plurality of keys;
a second casing which is pivotally coupled to the first casing, and which includes having a first display section adapted to face the first casing and a second display section on an opposite side of the second casing from the first display section; and
a display device mounted on the second casing, the display device comprising:
a flat backlight including a light source which emits light and a light guide plate having an end face facing the light source, a front surface, and a back surface opposed to the front surface, wherein the light from the light source is incident on the end face, and is partially guided in the light guide plate while being internally reflected by the front and back surfaces, so as to partially emerge from the front and back surfaces;
a first optical element, which includes a polarizing/separating layer, and which is disposed on a side of the front surface of the light guide plate to partially transmit the light emerged from the front surface of the light guide plate toward an outside and to partially return the light to the light guide plate;
a second optical element, which includes a polarizing/separating layer, and which is disposed on a side of the back surface of the light guide plate to partially transmit the light emerged from the back surface of the light guide plate toward an outside and to partially return the light to the light guide plate;
a first liquid crystal display, which has a front side and a back side opposed to the front side and two polarizing plates disposed on the front side and the back side, respectively, and which is disposed on a side of the first optical element such that the back side faces the first optical element; and
a second liquid crystal display, which has a front side and a back side opposed to the front side and two polarizing plates disposed on the front side and the back side, respectively, and which is disposed on a side of the second optical element such that the back side faces the second optical element.

9. The cell phone according to claim 8, wherein the polarizing/separating layer of the first optical element comprises a transmission axis and a reflection axis.

10. The cell phone according to claim 9, wherein the polarizing plate disposed on the back side of the first liquid crystal display comprises a transmission axis which is substantially parallel to the transmission axis of the polarizing/separating layer of the first optical element.

11. The cell phone according to claim 10, wherein the polarizing/separating layer of the second optical element comprises a transmission axis and a reflection axis.

12. The cell phone according to claim 11, wherein the polarizing plate disposed on the back side of the second liquid crystal display comprises a transmission axis which is substantially parallel to the transmission axis of the polarizing/separating layer of the second optical element.

13. The cell phone according to claim 8, wherein the light guide plate comprises a diffusion surface formed on the back surface thereof.

14. The cell phone according to claim 13, wherein the first optical element comprises a diffusion layer.

15. A cell phone comprising:
a first casing having a plurality of keys;
a second casing which is pivotally coupled to the first casing, and which includes a first display section adapted to face the first casing and a second display section on an opposite side of the second casing from the first display section; and
a display device mounted on the second casing, the display device comprising:
a flat backlight including a front surface and a back surface opposed to the front surface, both for emitting light therefrom;
a first reflection polarizing plate, which is disposed on a side of the front surface of the flat backlight, and which partially transmits the light emerged from the front surface toward a front side, and partially returns the light to a rear side;
a second reflection polarizing plate, which is disposed on a side of the back surface of the flat backlight, and which transmits at least a part of the light emerged from the back surface;
a first liquid crystal display which faces the first display section of the second casing, and which includes a front side and a back side and two polarizing plates disposed on the front side and the back side, respectively; and
a second liquid crystal display which faces the second display section of the second casing, and which includes a front side and a back side and two polarizing plates disposed on the front side and the back side, respectively.

16. The cell phone according to claim 15, wherein the second liquid crystal display has a smaller display area than a display area of the first liquid crystal display.

17. The cell phone according to claim 15, wherein the first liquid crystal display comprises a color image display and the second liquid crystal display comprises a mono-chrome image display.

18. The cell phone according to claim 15, wherein at least one of the first and second liquid crystal displays comprises an STN type liquid crystal display.

19. The cell phone according to claim 15, wherein a diffusion layer is disposed between one of the first and second liquid crystal displays and the flat backlight.

20. The cell phone according to claim 15, wherein the flat backlight comprises a diffusion surface formed on at least of one of the two opposing surfaces.

21. The cell phone according to claim 15, wherein light emitted from each of the front and back surfaces of strikes a corresponding one of the first and second reflection polarizing plates, and each of polarized light components along reflection axes of the first and the second reflection polarizing plates is reflected to return to the flat backlight.

* * * * *